US008451924B2

(12) United States Patent
Ylitalo (10) Patent No.: US 8,451,924 B2
(45) Date of Patent: May 28, 2013

(54) SIMULATION OF MULTI-ANTENNA RADIO CHANNEL (75) Inventor: Juha Ylitalo, Oulu (FI)

(73) Assignee: Elektrobit System Test Oy, Oulu (FI)

( * ) Notice: Subject to any disclaimer, the term of this patent is extended or adjusted under 35 U.S.C. 154(b) by 601 days.

(21) Appl. No.: 12/596,230

(22) PCT Filed: Apr. 25, 2007

(86) PCT No.: PCT/FI2007/050225
§ 371 (c)(1),
(2), (4) Date: Mar. 3, 2010

(87) PCT Pub. No.: WO2008/132268
PCT Pub. Date: Nov. 6, 2008

(65) Prior Publication Data
US 2011/0188595 A9    Aug. 4, 2011

(51) Int. Cl.
*H04B 7/02* (2006.01)

(52) U.S. Cl.
USPC ........... 375/267; 375/350; 375/219; 455/501; 455/500

(58) Field of Classification Search
USPC .......................................... 375/267, 260, 350
See application file for complete search history.

(56) References Cited

U.S. PATENT DOCUMENTS

| 6,993,069 B1 | 1/2006 | Donati et al. |
| 2003/0050020 A1 | 3/2003 | Erceg et al. |
| 2004/0044506 A1 * | 3/2004 | Meinila et al. .................... 703/5 |
| 2005/0008109 A1 * | 1/2005 | Kemppainen et al. ........ 375/350 |
| 2006/0181456 A1 | 8/2006 | Dai |

FOREIGN PATENT DOCUMENTS

| EP | 1768284 A1 | 3/2007 |
| JP | 2007-067951 A | 3/2007 |
| KR | 1020050044373 A | 5/2005 |
| WO | WO03041308 A1 | 5/2003 |
| WO | WO2006075051 A1 | 7/2006 |
| WO | WO2006136645 A1 | 12/2006 |

OTHER PUBLICATIONS

Office Action from Korean Intellectual Property Office for corresponding Korean Application No. 10-2009-7024398, Feb. 16, 2011.
J. Kolu et al., "A Real-Time simulator for MIMO Radio Channels", IEEE, pp. 568-572 (2002).
Picol et al., "MIMO Hardware Simulator Design for UMTS and WLAN Applications", The European Conf. on Wireless Technology, 3-4, pp. 355-358, (2005).
Paulraj et al., "An Overview of MIMO Communications—A Key to Gigabit Wireless", IEEE, vol. 92, No. 2, (2004).
English translation of Official Action issued in the corresponding Japanese application.
Official Action Issued in Corresponding Canadian Application No. 2,684,070, pp. 1-3, Jan. 10, 2013.

* cited by examiner

*Primary Examiner* — Eva Puente
(74) *Attorney, Agent, or Firm* — Hoffman & Baron, LLP (57) ABSTRACT

A radio channel simulation system comprises a plurality of input buses for receiving a beam-specific transmit signal. A transformation module transforms a channel model from antenna domain to beam domain by using a transformation algorithm and beam forming weights. The channel model represented in the beam domain is inputted into a processing module which processes the beam-specific transmit signals according to the channel model represented in the beam domain.

10 Claims, 5 Drawing Sheets

PRIOR ART

FIG. 1

PRIOR ART

FIG. 2

PRIOR ART

```
                    START
                     900
                      │
                      ▼
┌─────────────────────────────────────────────┐
│   RECEIVE PLURALITY OF BEAM-SPECIFIC    902 │
│   TRANSMIT SIGNALS INTO SIMULATION SYSTEM   │
└─────────────────────────────────────────────┘
                      │
                      ▼
┌─────────────────────────────────────────────┐
│   TRANSFORM CHANNEL MODEL FROM ANTENNA  904 │
│   DOMAIN TO BEAM DOMAIN BY USING TRANSFORMATION │
│   ALGORITHM AND BEAM FORMING WEIGHTS        │
└─────────────────────────────────────────────┘
                      │
                      ▼
┌─────────────────────────────────────────────┐
│   PROCESS BEAM-SPECIFIC TRANSMIT SIGNALS 906│
│   ACCORDING TO CHANNEL MODEL REPRESENTED    │
│             IN BEAM DOMAIN                  │
└─────────────────────────────────────────────┘
                      │
                      ▼
                     END
                     908              FIG. 9
```

FIG. 10

SIMULATION OF MULTI-ANTENNA RADIO CHANNEL

CROSS-REFERENCE TO RELATED APPLICATION

This application is a National Phase application of International Application No. PCT/FI2007/050225 filed Apr. 25, 2007, which is incorporated herein by reference.

BACKGROUND

1. Field

The invention relates to a system for simulating a multi-antenna radio channel, a method and a computer program.

2. Description of the Related Art

Radio channel simulations play an important role in testing multi-antenna radio devices, such as MIMO-based (Multiple-Input Multiple-Output) base stations and mobile terminals. A typical radio channel simulation system involves a transmitter device with M transmit antennas, a receiver device with N receive antennas, and a radio channel emulator implementing an M×N channel model to the transmit signals. The transmitter device and the receiver device carry out transmit and receive algorithms, respectively.

In a typical radio channel simulation, channel coefficients are provided to the radio channel simulations system, which channel coefficients characterize radio paths between each transmit-receive antenna pair. The physical effects of the channel coefficients on propagating signals are implemented with a processing network comprising a great amount of hardware resources, such as processors, delay elements, multipliers and summing elements.

The hardware resources form the primary limiting factor with respect to accuracy and flexibility of the radio channel simulations. Therefore, it is relevant to consider improvements regarding radio channel simulation systems.

SUMMARY

An object of the invention is to provide an improved system, method and a computer program for simulating a multi-antenna radio channel. According to an aspect of the invention, there is provided a system for simulating a multi-antenna radio channel, comprising: a plurality of input buses, each input bus configured to receive a beam-specific transmit signal; a transformation module configured to transform channel model from antenna domain to beam domain by using a transformation algorithm and beam forming weights; and a processing module configured to process the beam-specific transmit signals according to the channel model represented in the beam domain.

According to a second aspect of the invention, there is provided a method of simulating a multi-antenna radio channel, comprising: receiving a plurality of beam-specific transmit signals into the simulation system; transforming a channel model from antenna domain to beam domain by using a transformation algorithm and beam forming weights; and processing the beam-specific transmit signals according to the channel model represented in the beam domain.

According to another aspect of the invention, there is provided a computer program encoding a computer program of instructions for executing a computer process for simulating a multi-antenna radio channel in a simulation system, wherein the computer process comprises: receiving a plurality of beam-specific transmit signals into the simulation system; transforming a channel model from antenna domain into beam domain by using a transformation algorithm and beam forming weights; and processing the beam-specific transmit signals according to the channel model represented in the beam domain.

The invention provides several advantages. In an embodiment of the invention, the processing resources requirements compared to prior art solutions are substantially lower, thus enabling to simulate larger antenna systems and multi-user cases with a reasonable processing effort. Furthermore, according to an embodiment of the invention, the invention enables simulating realistic interference effects.

BRIEF DESCRIPTION OF THE DRAWINGS

In the following, the invention will be described in greater detail with reference to the embodiments and the accompanying drawings, in which.

DETAILED DESCRIPTION

Figure 1:
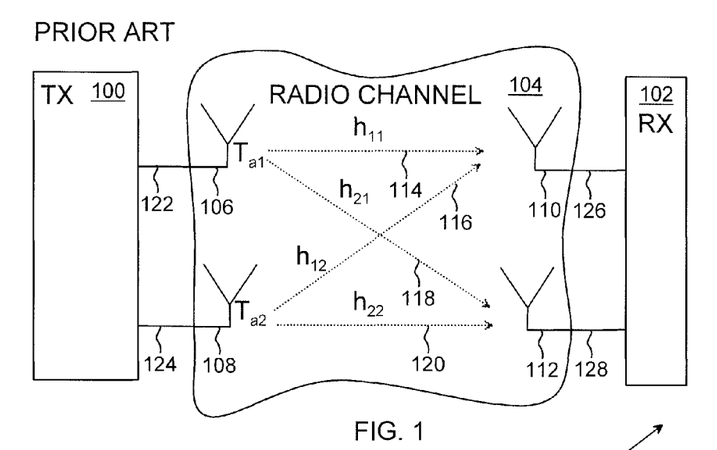
FIG. 1 shows a prior art radio channel model.

FIG. 1 illustrates principles of prior art radio channel simulation for MIMO (Multiple-Input Multiple-Output) radio channel, which is formed by using at least two transmit antennas 122, 124 and at least two receive antennas 126, 128.

FIG. 1 shows a transmitter 100 connected to transmit antennas 106, 108, a receiver 102 connected to receive antennas 110, 112, and a radio channel 104 emulating the effects from the radio propagation paths and the antennas 122 to 128.

The transmitter 100 inputs transmit signals 122 and 124 into the transmit antennas 106 and 108, respectively. The transmit antennas transmit antenna signals $T_{a1}$, $T_{a2}$ to the radio channel 104. The receiver 102 receives a portion of the electromagnetic wave produced by the transmit antennas 106, 108 and outputs receive signals 126 and 128 from the receive antennas 110 and 112, respectively.

FIG. 1 further shows propagation channels 114, 116, 118, and 120 in terms of complex antenna domain channel coefficients $h_{11}$, $h_{12}$, $h_{21}$ and $h_{22}$, respectively. The antenna domain channel coefficients characterize an antenna domain channel model.

Each antenna domain channel coefficient characterizes a propagation channel between a transmit-receive antenna pair of a transmit antenna 122, 124 and a receive antenna 126, 128. The antenna domain channel coefficients may also be called a channel tap and/or an impulse response, and they define the amplitude and the phase angle characteristics of the corresponding signal paths. In a wideband channel with bandwidth B, delay domain channel taps may characterize the frequency response of the propagation channel.

Figure 2:
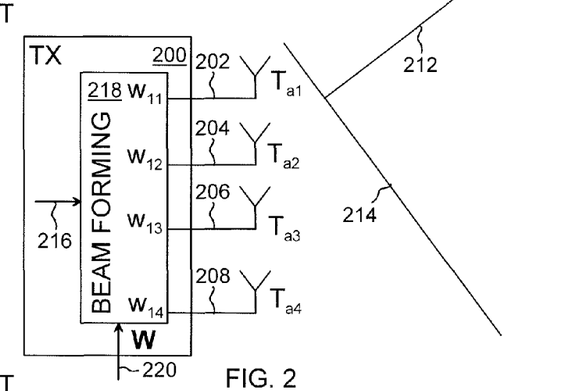
FIG. 2 illustrates a prior art transmitter structure in a radio channel simulator.

With reference to FIG. 2, the prior art transmitter (TX) 200 involves a beam forming antenna arrangement and a beam former 218 which receives a test signal 216 and applies beam forming weights to the test signal 216. As a result, a wave front 214 is generated by antennas 202, 204, 206, 208, which wave front 214 manifests itself as a directional radiation pattern 212.

The complex-valued beam forming antenna weights $w_{11}$, $w_{12}$, $w_{13}$, $w_{14}$ for the directional radiation pattern 212 form a beam forming vector $w_1$. Typically it consists of unit-amplitude phase shifters in a way that the phase shift alters linearly from one antenna to another. If multiple parallel beams are desired, each beam direction i is associated with a different weight vector and the set of beams may be presented with a beam forming matrix (W=$w_1$, $w_2$, $w_3$, $w_4$), where $w_1$, $w_2$, $w_3$, $w_4$ are beam forming vectors for four beams in the exemplified case. The beam form weights 220 are inputted into the transmitter 200 via a user interface of the radio channel simulation system. The antennas 202 to 208 are arranged to provide a coherent electromagnetic field which is obtained by separating the antennas 202 to 208 by the order of a half of the wavelength of the carrier frequency applied in the wireless telecommunication system.

Figure 3:
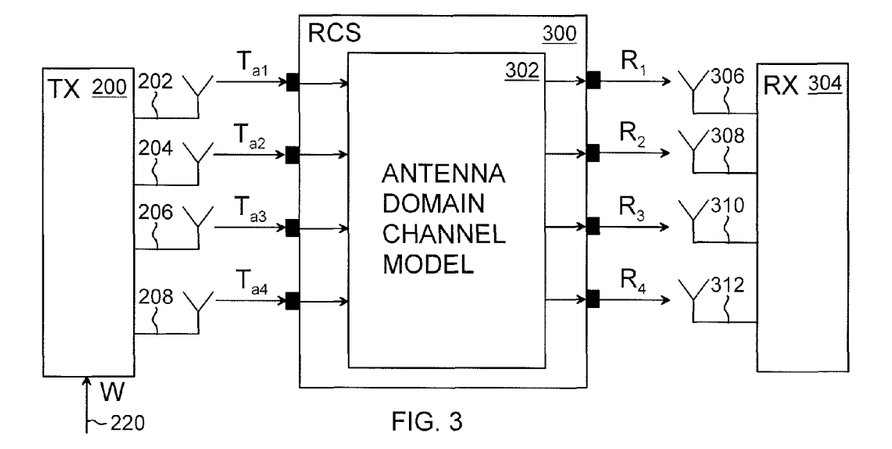
FIG. 3 illustrates a prior art radio channel simulator.

With reference to FIG. 3, a prior art radio channel simulator 300 receives the transmit antenna signals $T_{a1}$, $T_{a2}$, $T_{a3}$, $T_{a4}$ and implements the antenna domain channel model 302 to the transmit antenna signals $T_{a1}$, $T_{a2}$, $T_{a3}$, $T_{a4}$. The prior art channel simulator 300 outputs receive antenna signals $R_1$, $R_2$, $R_3$, $R_{14}$ which are delivered to the receiver 304.

A signal propagation in antenna domain channel model 302 in a 4×4 case may be represented in a matrix-vector form as follows:

$$R = HT_a, \quad (1)$$

where $$R = (R_1 \ R_2 \ R_3 \ R_4) \quad (2)$$

$$H = \begin{pmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{pmatrix} \quad (3)$$

and $$T_a = \begin{pmatrix} T_{a1} \\ T_{a2} \\ T_{a3} \\ T_{a4} \end{pmatrix} = WT. \quad (4)$$

In the prior art representation, the beam forming weights w are included in the transmit antenna signals $T_{a1}$, $T_{a2}$, $T_{a3}$, $T_{a4}$. In Equation (4), T is the desired transmit signal in the beam direction defined by w. In simple beam forming, $T_{a1}$, $T_{a2}$, $T_{a3}$, $T_{a4}$ are phase shifted versions of T.

The prior art radio channel simulation involves implementing the effects of H matrix to the transmit antenna signals $T_{a1}$, $T_{a2}$, $T_{a3}$, $T_{a4}$ in signal space with hardware resources, such as multipliers, adders and delay elements or with a central processing unit.

In the prior art radio channel simulation, a reference resource requirement is proportional to M×N, where M and N are the number of transmit antennas 202 to 208 and the number of receive antennas 306 to 312, respectively. Thus, in a 4×4 MIMO system, the reference resource requirement is proportional to 16. The reference resource requirement characterizes hardware resources required for carrying out a multi-antenna radio channel simulation on one delay tap in a narrow band channel.

Figure 4:
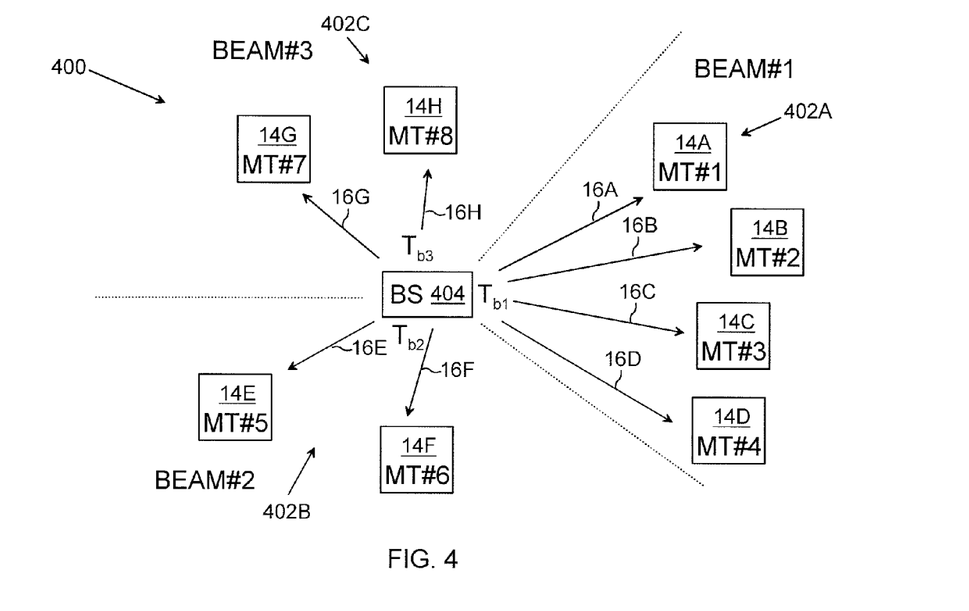
FIG. 4 shows an example of a wireless telecommunication system to be simulated.

With reference to FIG. 4, a wireless telecommunication system 400 to be simulated may comprise a base station (BS) 404 which forms directional radiation patterns 402A, 402B, 402C, also referred to as beams 402A, 402B, 402C and/or sectors 402A, 402B, 402C. A beam 402A, 402B, 402C may provide one or more mobile terminals (MT#1, . . . , MT#8) 14A to 14G with radio service. In the example, a first beam (BEAM#1) 402A serves mobile terminals 14A to 14D, a second beam (BEAM#2) 402B serves mobile terminals 14E, 14F, and a third beam (BEAM#3) serves mobile terminals 14G, 14H.

In the example case, at least three transmit antenna elements are required to form the three beams 402A, 402B, 402C.

Propagation paths 16A to 16H from the base station 204 to the mobile terminals 14A to 14H are also shown.

The wireless telecommunication system 400 utilizes a multi-antenna communication, such as MIMO, MISO (Multiple Input Single Output) and/or SIMO (Single Input Multiple Output).

Figure 5:
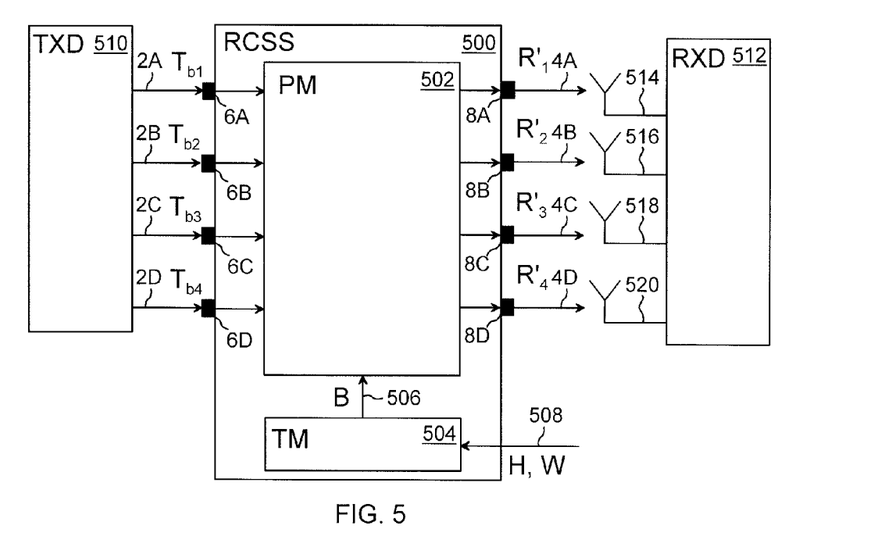
FIG. 5 shows a first example of a radio channel simulation system according to an embodiment of the invention.

With reference to an example of FIG. 5, a radio channel simulation system 500 according to an embodiment of the invention comprises input buses 6A, 6B, 6C, 6D, a transformation module (TM) 504 and a processing module (PM) 502. FIG. 5 further shows a transmitter domain (TXD) 510 and a receiver domain (RXD) 512.

The example of FIG. 5 and the associated discussion deal with a system of 4 input buses 6A to 6D and 4 output buses 8A to 8D. The teachings of the embodiments of the invention may, however, be applied to a radio channel simulation system with any number of input buses and output buses in a multi-antenna system.

The transmitter domain 510 generates beam-specific transmit signals ($T_{b1}$) 2A, ($T_{b2}$) 2B, ($T_{b3}$) 2C, ($T_{b4}$) 2D and inputs the beam-specific transmit signals 2A to 2D to the input buses 6A to 6D. The input buses 6A to SD pass the beam-specific transmit signals 2A to 2D to the processing module 502. An input bus 6A to 6D comprises at least connecting means.

A beam-specific transmit signal 2A to 2D is a signal directed at a selected beam. For example, beam-specific signals 2A, 2B, 2C are signals directed at the first beam 402A, the second beam 402B and the third beam 402C, respectively.

The transmitter domain 510 may represent a single transmitter, such as the base station 404, a mobile station or any transmitter whose signal propagation is to be simulated. In an embodiment of the invention, each beam-specific signal 2A to 2D originates from a different transmitter, such as from different base stations 404.

The receiver domain 512 represents a single receiver or a group of receivers. In an embodiment, the receiver domain 512 represents a single mobile terminal 14A to 14H with a group of receive antennas 514 to 520. In another embodiment, the receiver domain 512 represents a plurality of mobile terminals 14A to 14H, where each mobile terminal 14A to 14H includes at least one receive antenna 514 to 512.

The transformation module 504 receives the channel model H represented in antenna domain and beam forming weights W in signal 508 and carries out an algorithm which changes the representation of the channel model from the antenna domain into the beam domain by using the beam forming weights W. The representation of the channel model in the antenna domain is herein referred to as an antenna domain channel model denoted by H. The representation of the channel model in the beam domain is herein referred to as a beam domain channel model, denoted by B.

The transformation of the representation between the antenna domain and the beam domain may be represented with transformation equation:

$$R = HT_a = W^*HWT_a = HWT,  \quad (5)$$

where the beam forming channel model B may be written with beam domain channel coefficients $b_{ij}$ as $$B = W^*H = \begin{pmatrix} b_{11} & b_{12} & b_{13} & b_{14} \\ b_{21} & b_{22} & b_{23} & b_{24} \\ b_{31} & b_{32} & b_{33} & b_{34} \\ b_{41} & b_{42} & b_{43} & b_{44} \end{pmatrix}, \quad (6)$$

and the transmit signals T may be transmitted via a selected beam.

In a simple scenario, matrix W comprises the beam forming weights whose amplitude is unity. However, any window function can be used for amplitude tapering. For example, Chebyshev, Bartlett, Hamming, Blackman-Harris or Gaussian window functions can be applied to beam shaping and to reduction of the side-lobe level. In an embodiment, the beam may be shaped to match the practical beam patterns used at base stations or mobile terminals.

A channel coefficient $b_{ij}$ characterizes the radio channel formed by the $j^{th}$ beam and the $i^{th}$ receive antenna. Thus, the representation of the channel model in the beam domain enables the user of the radio channel simulation system 500 to select a relevant beam and receive antenna 514 to 516 and restrict the consideration within the relevant beam and receive antenna.

The transformation module 504 inputs the beam domain channel model 506, i.e. relevant b coefficients, to the processing module 502.

The processing module 502 processes the beam-specific transmit signals 2A to 2D according to the beam domain channel model and outputs output signals ($R_1'$) 4A, ($R_2'$) 4B, ($R_3'$) 4C, ($R_4'$) 4D via output buses 8A to 8D to the receiver domain 512.

Figure 6:
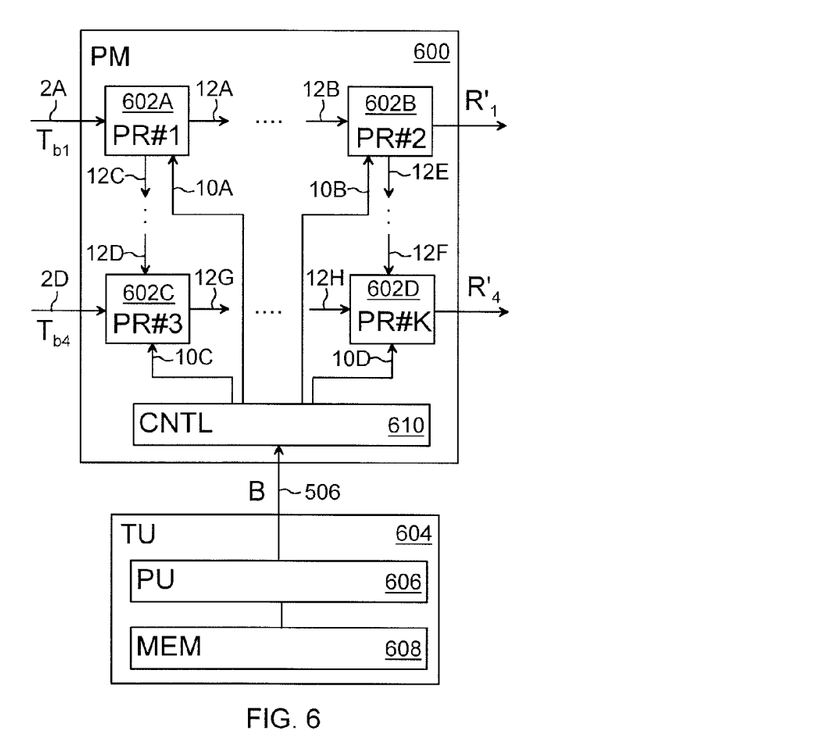
FIG. 6 shows an example of an implementation of radio channel simulation system.

With reference to FIG. 6, the processing module 600 may comprise a network of configurable processing resources 602A to 602D, such as FPGAs (Field Programmable Gate Array). The network of the configurable processing resources 12A to 12H receives the beam-specific transmit signals 2A to 2D and routes and processes the propagation signals 12A to 12H according to the beam domain channel model.

The configurable processing resources 602A to 602D may be configured to implement the processing module 500 and parts of the transformation module 504.

The processing module 600 may comprise a controller (CNTL) 610 which provides the configurable processing resources 602A to 602D with configuration information 10A to 10D. The configuration information 10A to 10D is used for configuring the configurable processing resources 602A to 602D so as to implement a desired channel model.

In an embodiment of the invention, the processing module 600 is implemented with one or more digital processors and software.

The transformation unit 604 may be implemented with a computer program executed in a processing unit 606 and stored in a memory unit 608. In an embodiment, a portion of the transformation unit is implemented with generic math tools, such as MATLAB.

Let us consider a simulation situation where the first beam 402A and the first mobile terminal 14A are selected so as to form a system under interest.

Figure 7:
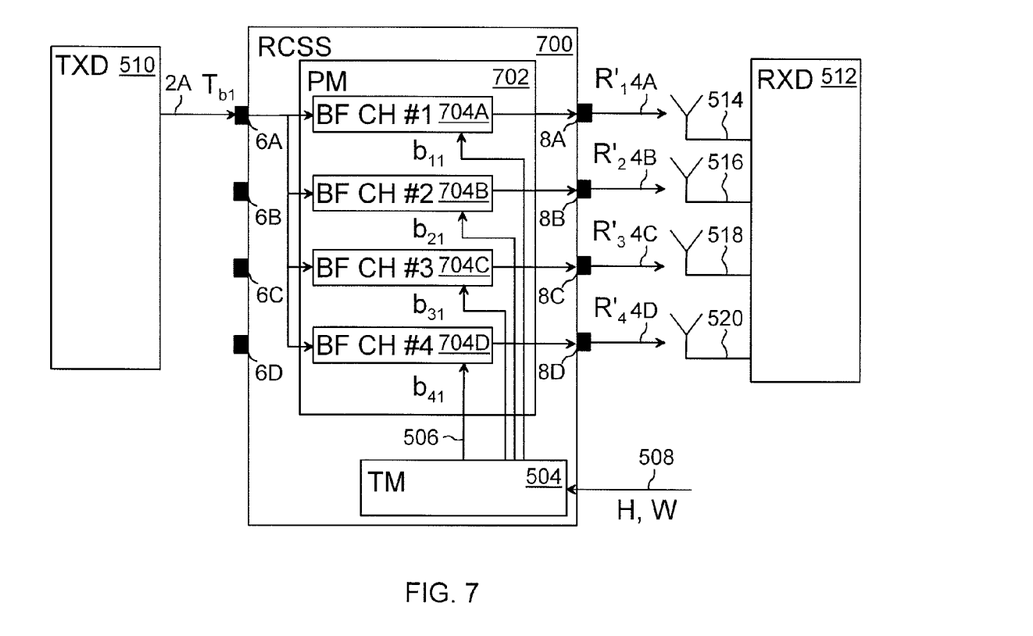
FIG. 7 shows a second example of a radio channel simulation system according to an embodiment of the invention.

FIG. 7 shows the configuration of the radio channel simulation system 700 suitable for simulation of such a system. The transmitter domain 510 represents the base station 404, and the receiver domain 512 represents the first mobile terminal 14A.

The transmit signal ($T_{b1}$) 2A presents the transmit signal directed at the first beam 402A. The signal is received with four antennas 514 to 520 in the receiver domain 512.

In the beam domain, a signal propagation may be characterized with a first beam forming channel (BF CH #1) 704A, (BF CH #2) 704B, (BF CH #3) 704C, (BF CH #4) 704D, where the beam forming channels 704A, 704B, 704C and 704D are associated with receive antennas 514, 516, 518 and 520, respectively. The beam forming channels 704A to 704D are implemented by the processing module 702.

Each beam forming channel 704A, 704B, 704C, 704D may be characterized with a single beam domain channel coefficient $b_{11}$, $b_{21}$, $b_{31}$ and $b_{41}$ respectively, and implemented with the configurable processing resources 602A to 602D of the processing module 700. For example, beam domain channel vector $b_1$ from 510 to 512 includes beam domain channel coefficients $b_{11}$, $b_{12}$, $b_{13}$, $b_{14}$, and in this case it may be written with elements of H matrix and W matrix as follows:

$$b_1 = w_1 * H \quad (7)$$

Each of the elements of $b_1$ corresponds to a beam forming channel 704A, 704B, 704C, 704D, each of which forms virtually an isolated 1×1 problem with processing requirement proportional to 1. Thus, the overall resource requirement is proportional to 4, thus freeing input buses 6B to 6D and corresponding computational resources for other use as compared to the reference system 300 shown in FIG. 3. In this case, the reference resource requirement of the reference system 300 is proportional to 3×4=12 (three transmit antennas, four receive antennas). With the hardware resources of the reference system 300, the excess computational resources may be used to increase the number of channel taps for the beam forming channels 604A, 604B, 604C, 604D and/or for simulating feedback channel from the mobile terminal MT#1 to the base station 604.

With further reference to FIG. 4, let us consider the first beam 402A as a primary beam 402A, and the second beam 402B and the third beam 402C as secondary beams 402B, 402C. The first mobile terminal 14A and the second mobile terminal 14B form the receiver domain 806. The radio channel simulation system according to an embodiment of the invention may be applied to simulate interference effects in the receiver domain due to the secondary beams 402B, 402C.

Figure 8:
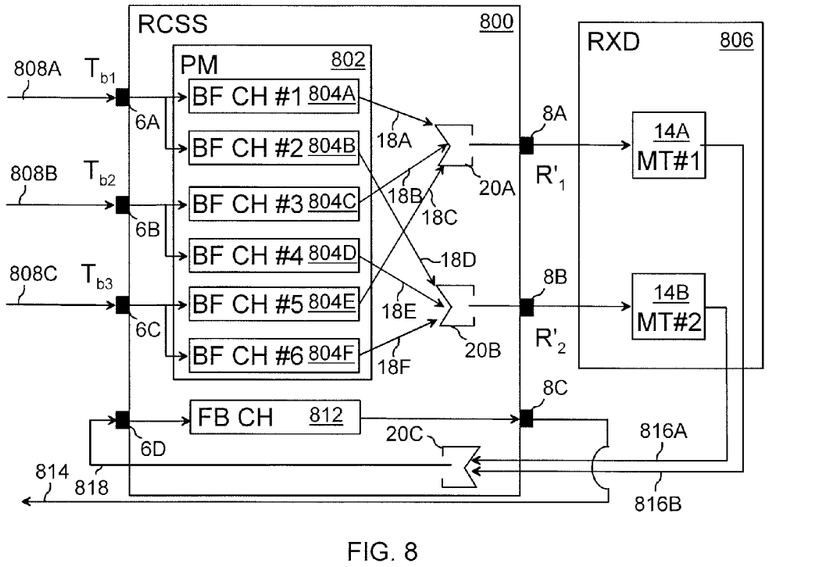
FIG. 8 shows a third example of a radio channel simulation system according to an embodiment of the invention.

FIG. 8 illustrates a configuration of the radio simulation system 800 suitable for simulating such a wireless telecommunication system.

The first input bus 6A receives a test signal ($T_{b1}$) 808A directed at the primary beam 402A. The test signal 808A may simulate a payload or a pilot signal, for example. The test signal 808A may be written as $$T_{b1} = s_1 + s_2 + s_3 + s_4, \quad (8)$$

where $s_1$, $s_2$, $s_3$ and $s_4$ are test signals dedicated to mobile terminals MT#1, MT#2, MT#3, and MT#4, respectively.

The second input bus 6B and the third input bus 6C receive interference signals ($T_{b2}$) 808B and ($T_{b3}$) 808C, respectively, directed at the secondary beams 402B, 402C. The interference signals 808B, 808C may be expressed as $$T_{b2} = s_5 + s_6$$

$$T_{b3}=s_7+s_8, \quad (9)$$

where $s_5$, $s_6$, $s_7$ and $s_8$ are signals dedicated to mobile terminals MT#5, MT#6, MT#7, and MT#8, respectively. The interference signals $s_5$, $s_6$, $s_7$ and $s_8$ may be any signals, such as payload signals, suitable for simulating interference effects.

The dedication of signals $s_1$ to $s_8$ to the mobile terminals MT#1 to MT#8 may be implemented with any multiple access method, such as CDMA (Code Division Multiple Access), WCDMA (Wideband Code Division Multiple Access), FDMA (Frequency Division Multiple Access) TDMA (Time Division Multiple Access), and/or OFDMA (Orthogonal Frequency Division Multiple Access).

The test signal 808A is inputted into a first beam forming channel (BF CH#1) 804A and a second beam forming channel (BF CH#2) 804B.

The first beam forming channel 804A simulates the propagation of the transmit signal 808A in the first beam 402A to the first mobile terminal 14A.

The second beam forming channel 804B simulates the propagation of the transmit signal 808A in the first beam 402A to the second mobile terminal 14B.

The interference signal 808B is inputted into a third beam forming channel (BF CH#3) 804C and a fourth beam forming channel (BF CH#4) 804D.

The interference signal 808C is inputted into a fifth beam forming channel (BF CH#5) 804E and a sixth beam forming channel (BF CH#6) 804F.

The third beam forming channel 804C simulates the propagation of the interference signal 808B in the second beam 402B to the first mobile terminal 14A.

The fourth beam forming channel 804D simulates the propagation of the interference signal 808B in the second beam 402B to the second mobile terminal 14B.

The fifth beam forming channel 804E simulates the propagation of the interference signal 808C in the third beam 402C to the first mobile terminal 14A.

The sixth beam forming channel 804F simulates the propagation of the interference signal 808C in the third beam 402C to the second mobile terminal 14B.

The admixture of the signals 18A to 18E outputted by the beam forming channels 804A to 804E is implemented in combiners 20A, 20B. The combiners output antenna signals $R'_1$, $R'_2$.

In this case, the beam forming channels 804A to 804F may be implemented with the network of configurable processing resources 602A to 602D, for example.

The beam domain channel response $b_{11}$ from the primary beam 402A to the antenna of MT#1 reduces to a single complex coefficient by multiplying the first row of H by the beam forming weight vector $w_1$ as follows:

$$b_{11}=w_1^* H_1, \quad (10)$$

where $H_1$ denotes the first row of H. The interference from the second beam 402B to the antenna of MT#1 can be calculated similarly by $$b_{12}=w_2^* H_1, \quad (11)$$

in which $b_{12}$ is the beam domain channel response from the second beam 402B to the antenna of MT#1. The interference from the third beam 402C may be calculated similarly.

Equations (10) and (11) show that the beam domain model enables splitting the general M×N problem into a plurality of 1×1 problems. The invention enables selecting appropriate 1×1 problems while secondary 1×1 problems may not require attention. On the contrary, in the antenna domain approach, the entire M×N problem is required to be solved, even though a portion of the system is under interest.

FIG. 8 further shows a feedback channel (FB CH) 812, which simulates a feedback signaling radio pathway from the mobile terminals 14A, 14B to the transmitter domain. The mobile terminals 14A, 14B may generate feedback signals 816A, 816B, which may be combined in a combiner 20C. The combiner 20C generates a combined feedback signal 818, which is inputted into the input bus 6D.

The feedback channel 812 processes the combined feedback signal and outputs a receive feedback signal 814.

The technical effect of simulating the interference effects in the beam domain is that the interference effects may be introduced as regular input signals into the system, whereas in the reference system 300, the interference effects are typically generated inside the system by the configurable processing resources 602A to 602D. Therefore, the beam domain simulation provides more realistic consideration for the interference effects.

The example of FIG. 8 and the associated description indicates that a beam domain simulation enables carrying out multi-user system level simulations, where the input test signals may present radio signals generated in separated transmitters, such as base stations, and the receiver domain may comprise several independent receivers, such as mobile terminals. The computational effort and system requirements can be reduced by limiting the explicit consideration to the beams and receivers under interest, while the interfering signal sources are used to generate the interference effects only.

Figure 9:
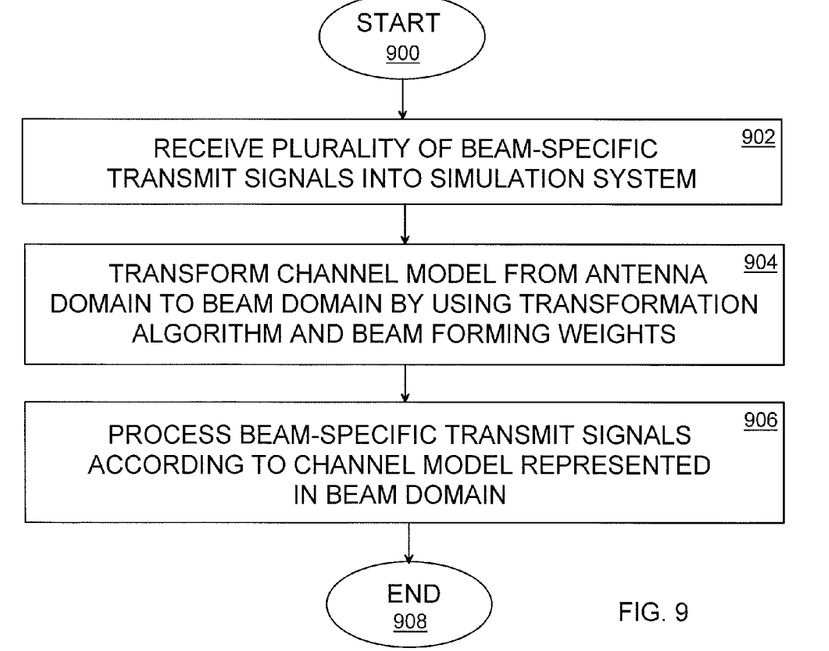
FIG. 9 shows a first example of a methodology and computer process according to an embodiment of the invention.

With reference to FIG. 9, process aspects according to embodiments of the invention are illustrated with a flow chart.

In 900, the method starts.

In 902, a plurality of beam-specific transmit signals 2A to 2D are received into the simulation system 500. In an embodiment of the invention, the channel model in the beam domain is inputted into configurable processing elements 602A to 602D for configuring the configurable processing elements 602A to 602D.

In 904, a channel model is transformed from antenna domain to beam domain by using a transformation algorithm and beam forming weights. In an embodiment of the invention, the channel model is transformed from antenna domain to beam domain for selected beams.

In 906, the beam-specific transmit signals 2A to 2D are processed according to the channel model represented in the beam domain. In an embodiment of the invention, the processing comprises processing the beam-specific transmit signals 2A to 2D by the network of the configurable processing elements 602A, to 602D. In an embodiment, beam-specific transmit signals 2A to 2D are processed for the selected beams.

In 908, the method ends.

Figure 10:
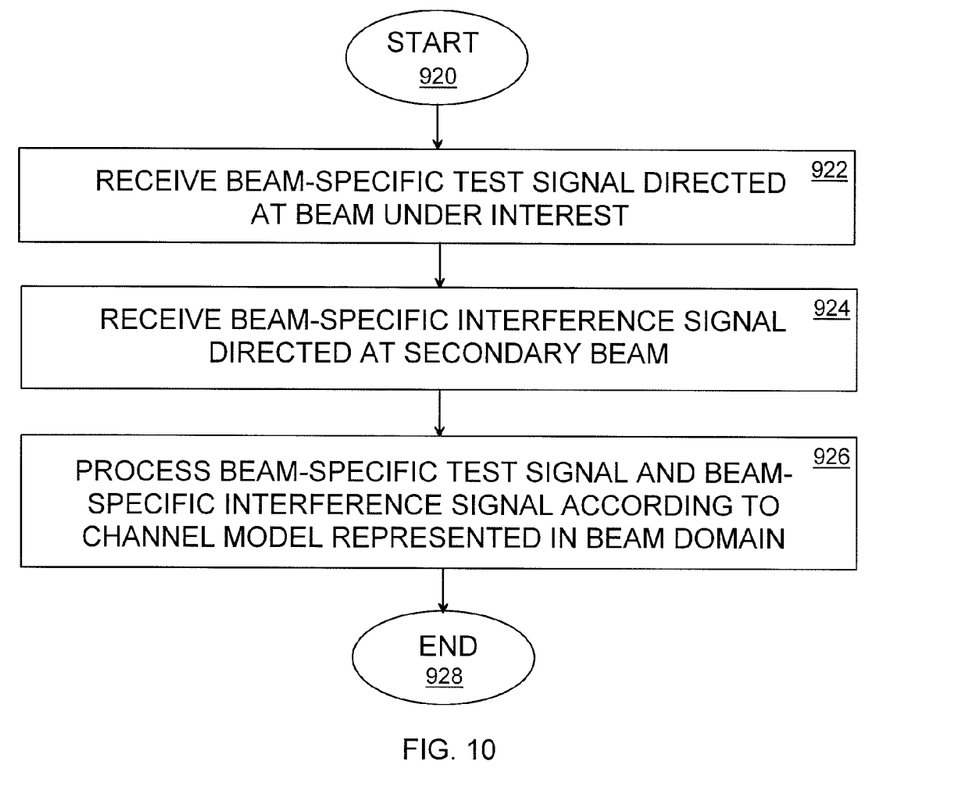
FIG. 10 shows a second example of a methodology and computer process according to an embodiment of the invention.

With reference to FIG. 10, process aspects according to further embodiments of the invention are illustrated with a flow chart.

In 920, the method starts.

In 922, a beam-specific test signal 808A directed at a beam 402A under interest is received.

In 924, a beam-specific interference signal 808B, 808C directed at a secondary beam 402B, 402C is received.

In 926, the beam-specific test signal 808A and the beam-specific interference signal 808B, 808C are processed according to the channel model represented in the beam domain.

In 928, the method ends.

The embodiments of the invention may be realized in configurable processing resources, such as FPGA or digital processors, and software. Some functions, such as the transformation from the antenna domain to the beam domain, may be implemented with a computer program executed in the processing unit 606 and stored in the memory unit 608. The beam forming matrices W can also be implemented as analog phase shift networks.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

What is claimed is:

1. A system for simulating a multi-antenna radio channel, the system comprising:
   a plurality of input buses, each input bus configured to receive a beam-specific transmit signal;
   a transformation module configured to transform a channel model from an antenna domain to a beam domain by using a transformation algorithm and beam forming weights; and
   a processing module configured to process the beam-specific transmit signals according to the channel model represented in the beam domain;
   wherein a first input bus is configured to receive a beam-specific test signal directed at a beam under interest, a second input bus is configured to receive a beam-specific interference signal directed at a secondary beam, and the processing module is configured to process the beam-specific test signal and the beam-specific interference signal according to the channel model represented in the beam domain.

2. The system of claim 1, wherein the processing module comprises a network of configurable processing elements, the system further comprising a controller configured to input the channel model in the beam domain into the configurable processing elements for configuring the configurable processing elements.

3. The system of claim 1, wherein the transformation module is configured to transform the channel model from the antenna domain into the beam domain for selected beams, and the processing module is configured to process the beam-specific transmit signals for the selected beams.

4. A method of simulating a multi-antenna radio channel, the method comprising:
   receiving a plurality of beam-specific transmit signals into a simulation system;
   transforming a channel model from an antenna domain to a beam domain by using a transformation algorithm and beam forming weights;
   processing the beam-specific transmit signals according to the channel model represented in the beam domain;
   receiving a beam-specific test signal directed at a beam under interest;
   receiving a beam-specific interference signal directed at a beam; and
   processing the beam-specific test signal and the beam-specific interference signal according to the channel model represented in the beam domain.

5. The method of claim 4, wherein the processing comprises processing the beam-specific transmit signals by a network of configurable processing elements, the method further comprising inputting the channel model in the beam domain into configurable processing elements for configuring the configurable processing elements.

6. The method of claim 4, further comprising:
   transforming the channel model from the antenna domain into the beam domain for selected beams; and
   processing the beam-specific transmit signals for the selected beams.

7. A non-transitory computer readable storage medium comprising instructions that, when executed by a processing device, cause the processing device to execute a computer process for simulating a multi-antenna radio channel in a simulation system by:
   receiving a plurality of beam-specific transmit signals into the simulation system;
   transforming a channel model from an antenna domain into a beam domain by using a transformation algorithm and beam forming weights;
   processing the beam-specific transmit signals according to the channel model represented in the beam domain;
   wherein the processing further comprises:
      receiving a beam-specific test signal directed at a beam under interst;
      receiving a beam-specific interference signal directed at a beam; and
      processing the beam-specific test signal and the beam-specific interference
   signal according to the channel model represented in the beam domain.

8. The non-transitory computer readable storage medium of claim 7, wherein the processing comprises processing the beam-specific transmit signals by a network of configurable processing elements, the computer process further comprising inputting the channel model in the beam domain into the configurable processing elements for configuring the configurable processing elements.

9. The non-transitory computer readable storage medium of claim 7, wherein the processing further comprises:
   transforming the channel model from antenna domain into beam domain for selected beams; and
   processing the beam-specific transmit signals for the selected beams.

10. The non-transitory computer readable storage medium of claim 7, wherein the computer readable storage medium comprises at least one of the following media: a computer readable medium, a program storage medium, a record medium, a computer readable memory, a computer readable software distribution package, and a computer readable compressed software package.

* * * * *